US011381596B1

(12) United States Patent
Sanchez et al.

(10) Patent No.: US 11,381,596 B1
(45) Date of Patent: Jul. 5, 2022

(54) ANALYZING AND MITIGATING WEBSITE PRIVACY ISSUES BY AUTOMATICALLY CLASSIFYING COOKIES (71) Applicant: NortonLifeLock Inc., Tempe, AZ (US)

(72) Inventors: Iskander Sanchez, Antibes (FR); Leylya Yumer, Antibes (FR)

(73) Assignee: NORTONLIFELOCK INC., Tempe, AZ (US)

( * ) Notice: Subject to any disclaimer, the term of this patent is extended or adjusted under 35 U.S.C. 154(b) by 188 days.

(21) Appl. No.: 16/712,081

(22) Filed: Dec. 12, 2019

(51) Int. Cl.
*H04L 9/40* (2022.01)

(52) U.S. Cl.
CPC ...... *H04L 63/1475* (2013.01); *H04L 63/1416* (2013.01)

(58) Field of Classification Search
CPC ............. H04L 63/1475; H04L 63/1416; H04L 63/1441
See application file for complete search history.

(56) References Cited

U.S. PATENT DOCUMENTS

| | | | | |
|---|---|---|---|---|
| 8,312,543 B1 * | 11/2012 | Gardner | ................... | H04L 67/02 726/23 |
| 2011/0209216 A1 * | 8/2011 | Zohar | ................. | G06F 16/9535 726/22 |
| 2017/0264626 A1 * | 9/2017 | Xu | ......................... | H04L 63/145 |
| 2018/0063190 A1 * | 3/2018 | Wright | ................ | H04L 63/1416 |
| 2020/0050761 A1 * | 2/2020 | Lancioni | ............... | G06F 21/554 |

OTHER PUBLICATIONS

Source code for "heuristicblocking.js" as part of EFForg/privacybadger, last modified Jun. 11, 2019 (16 pages + cover sheet) https://github.com/EFForg/privacybadger/blob/948fd3037c53348ff8738ef2ac06f6fad7dd2fd7/src/js/heuristicblocking.js (Year: 2019).*
"Privacy Badger FAQ" Article published Oct. 9, 2018 as verified by the Internet Archive (10 pages) https://web.archive.org/web/20181009190808/https://www.eff.org/privacybadger/faq (Year: 2018).*

(Continued)

*Primary Examiner* — Fatoumata Traore
*Assistant Examiner* — Thomas A Gyorfi
(74) *Attorney, Agent, or Firm* — Maschoff Brennan (57) ABSTRACT

Analyzing and mitigating website privacy issues by automatically classifying cookies. In some embodiments, a method may include identifying a cookie for a website, obtaining a cookie generation flow related to generation of the cookie, obtaining a cookie sharing flow related to sharing of the cookie, extracting features related to the cookie generation flow and the cookie sharing flow, determining flow patterns in the cookie generation flow and the cookie sharing flow, automatically creating a stratified classification for the cookie based on the features and the flow patterns that explains how the cookie interacts with a website and with third-party resources loaded on the website, determining whether the stratified classification for the cookie exceeds a weighted suspiciousness threshold value, and in response to determining that the stratified classification for the cookie exceeds the weighted suspiciousness threshold value, determining that the cookie is suspicious and initiating a security action on the cookie.

18 Claims, 3 Drawing Sheets

(56) References Cited

OTHER PUBLICATIONS

Ghostery; "Privacy Protection for Everyone"; Webpage; located at: https://www.ghostery.com/; accessed on Dec. 12, 2019; 3 pages.
UBlock; "The Fastest, Most-Powerful Ad Blocker"; Webpage; located at: https://ublock.org/; accessed on Dec. 12, 2019; 1 page.
Electric Frontier Foundation; "Privacy Badger"; Webpage; located at: https://www.eff.org/privacybadger; accessed on Dec. 12, 2019; 1 page.
U.S. Appl. No. 16/449,116, filed Jun. 21, 2019, titled: "Analyzing and Mitigating Privacy Issues on a Computing Device Using Cookie Generation Flows", 33 pages.

* cited by examiner

ANALYZING AND MITIGATING WEBSITE PRIVACY ISSUES BY AUTOMATICALLY CLASSIFYING COOKIES

BACKGROUND

Online user privacy is an important need both for individuals and for institutions. Furthermore, with the adoption of the General Data Protection Regulation (GDPR) in the European Union (EU), there is an increasing need for websites to become compliant with privacy regulations, and to protect users from being tracked without users' knowledge or permission. Some current methods and systems to protect user privacy on the Internet are limited to blacklists. However, a blacklist may only be useful for identifying malware using an already existing database of file hash functions (e.g., MD5s). Thus, a solution to determine and protect user privacy on the Internet and to help websites become compliant with privacy regulations is needed.

The subject matter claimed herein is not limited to embodiments that solve any disadvantages or that operate only in environments such as those described above; rather, this background is only provided to illustrate one example technology area where some embodiments described herein may be practiced.

SUMMARY

In some embodiments, a computer-implemented method for analyzing and mitigating website privacy issues by automatically classifying cookies may be performed by a computing device including one or more processors. The method may include identifying, by the computing device, a cookie for a website created on a web browser while browsing the website; obtaining, by the computing device, a cookie generation flow related to generation of the cookie; obtaining, by the computing device, a cookie sharing flow related to sharing of the cookie; extracting, by the computing device, features related to the cookie generation flow and the cookie sharing flow; determining, by the computing device, flow patterns in the cookie generation flow and the cookie sharing flow; automatically creating, by the computing device, a stratified classification for the cookie, based on the features and the flow patterns, that explains how the cookie interacts with the website and with third-party resources loaded on the website; determining, by the computing device, whether the stratified classification for the cookie exceeds a weighted suspiciousness threshold value; and in response to determining that the stratified classification for the cookie exceeds the weighted suspiciousness threshold value, determining, by the computing device, that the cookie is suspicious and initiating a security action on the suspicious cookie.

In some embodiments, the initiating of the security action on the suspicious cookie may include blocking the suspicious cookie, disabling the suspicious cookie, preventing creation of similar suspicious cookies, or alerting an administrator regarding the suspicious cookie, or a combination thereof.

In some embodiments, the features related to the cookie generation flow may include cookie parameter(s), cookie name, cookie value, overwritten data, identifier detection, or generation method, or some combination thereof.

In some embodiments, the features related to the cookie generation flow may include historical server behavioral data, script data or metadata, request data or metadata, or execution context, or some combination thereof.

In some embodiments, the features related to the cookie sharing flow may include cookie parameter(s), cookie name, cookie value, overwritten data, identifier detection, generation method, share type, or share location, or some combination thereof.

In some embodiments, the features related to the cookie sharing flow may include historical server behavioral data, script data or metadata, request data or metadata, or execution context, or some combination thereof.

In some embodiments, the determining of the flow patterns in the cookie generation flow and the cookie sharing flow may include determining relationships between the cookie generation flow and the cookie sharing flow.

In some embodiments, the automatically creating of the stratified classification for the cookie may include independently calculating hierarchical groups for the cookie based on behaviors exhibited by the cookie.

In some embodiments, the method may further include analyzing the flow patterns in the cookie generation flow and the cookie sharing flow over time to identify differences in occurrences in existing domains or new domains; and in response to identifying differences in occurrences in the existing domains or in the new domains, creating a feedback cycle to update both the stratified classification for the cookie and the weighted suspiciousness threshold value.

In some embodiments, the stratified classification for the cookie may further identify each party involved both in the generation of the cookie as well as in the sharing of the cookie.

In some embodiments, one or more non-transitory computer-readable media may include one or more computer-readable instructions that, when executed by one or more computing devices, cause the one or more computing devices to perform a method for analyzing and mitigating website privacy issues by automatically classifying cookies.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Tracking users' personal information and habits on the Internet is becoming more and more common, and is frequently accomplished through the use of cookies, which may be strings of text loaded onto a user's web browser when a user visits a website. A cookie may provide the website information to recognize and remember users, and may include the ability to track each user's search engine queries, the websites a user visits, the frequency of a user's return visits to a website, the speed a user scrolls through a webpage, where the user stops scrolling within a webpage, movement of a mouse cursor within a webpage, user comments, user clicks, user entries in forms, how long a user stays a specific location or at a specific website or webpage, etc. However, it may not be clear to users when they are being tracked, how they are being tracked, by whom they are being track, where the data is being sent, and why the data is being collected and sent. Furthermore, websites themselves may not be aware of all tracking of users.

In a lifetime of a website, a long list of cookies may be created for one reason or another, some unintentionally, and this may create problems for website owners that wish to provide privacy preserving services to their users. In some cases, the unintentional creation of a cookie may be due to a library that a website is loading that was not created by the website developer. For example, once a script is included in the website, the script may generate chains of calls and requests that create multiple unexpected cookies. In some cases, a website owner may not be able to identify when a cookie is created, who created the cookie, how the cookie was created, and for what reasons the cookie was created, making it difficult, if not impossible, for the website owner to filter out unnecessary, privacy-evading cookies.

Conventional solutions for identifying cookies do not take into consideration the diverse factors that are involved in the generation of cookies, and are instead concerned with looking at one side of the problem (e.g., blacklists). In addition, conventional solutions, such as ghostery and uBlock, only use blacklists to perform the analysis on whether a cookie is troublesome. A blacklist, however, may be easily bypassed by renaming the domain name of the website on which the cookie is created. Further, domain blacklisting systems may have high false positive rates. Therefore, there is an urgent need for a methodology that can accurately identify all of the cookies created in/for a website and that can classify the cookies such that the website owners can decide which cookies to keep and which cookies to disable.

Some embodiments include analyzing and mitigating website privacy issues by automatically classifying cookies. In some embodiments, a cookie analysis application may identify a cookie for a website created on a web browser while browsing the website, obtain a cookie generation flow related to generation of the cookie and a cookie sharing flow related to sharing of the cookie, extract features related to the cookie generation flow and the cookie sharing flow, determine flow patterns in the cookie generation flow and the cookie sharing flow, and automatically create a stratified classification for the cookie, based on the features and the flow patterns, that explains how the cookie interacts with the website and with third-party resources loaded on the website. In these embodiments, the cookie analysis application may then determine whether the stratified classification for the cookie exceeds a weighted suspiciousness threshold value and, if so, determine that the cookie is suspicious and initiate a security action on the suspicious cookie. In these embodiments, the cookie analysis application may further analyze the flow patterns in the cookie generation flow and the cookie sharing flow over time to identify differences in occurrences in existing domains or new domains, and in response to identifying differences in occurrences in the existing domains or in the new domains, create a feedback cycle to update both the stratified classification for the cookie and the weighted suspiciousness threshold value.

Thus, some embodiments disclosed herein may be employed to better identify the different types of cookies that are being created on websites. Some embodiments precisely classify a cookie by identifying the content of the cookie as well as the parties that are involved both in the generation and the sharing of the cookie. Some embodiments may then employ this precise classification to control the cookie in order to make the corresponding website compliant with specific privacy regulations, such as the GDPR in the EU, and/or in order to protect users from being tracked without users' knowledge or permission.

Figure 1:
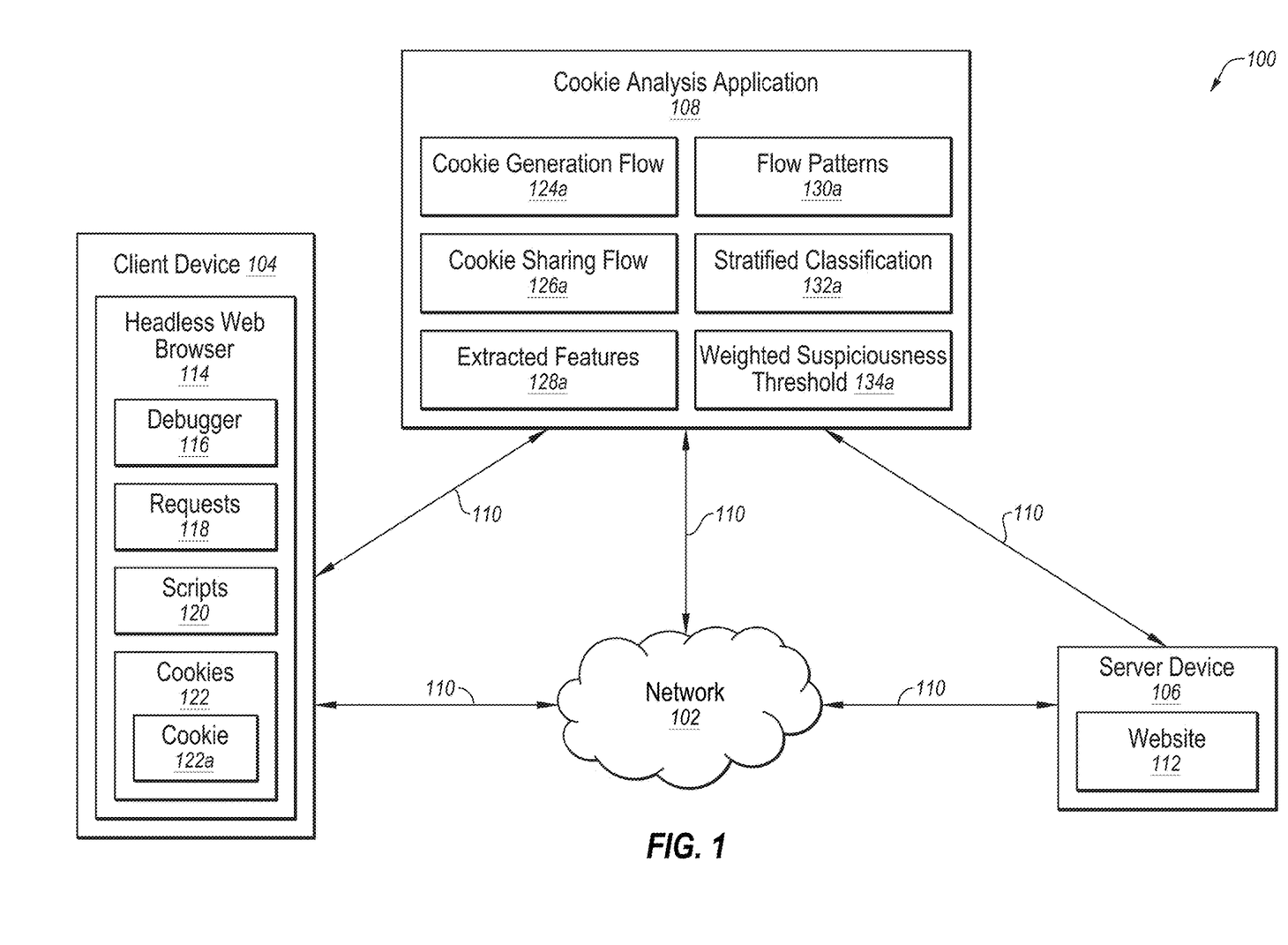
FIG. 1 illustrates an example system configured for analyzing and mitigating website privacy issues by automatically classifying cookies.

Turning to the figures, FIG. 1 illustrates an example system configured for analyzing and mitigating website privacy issues by automatically classifying cookies. The system 100 may include a network 102, a client device 104, a server device 106, and a cookie analysis application 108. In some embodiments, the cookie analysis application 108 may execute on a standalone device that communicates with the client device 104 and the server device 106. In other embodiments, however, the cookie analysis application 108 may execute on, or be part of, the client device 104 and/or the server device 106.

In some embodiments, the network 102 may be configured to communicatively couple the client device 104, the server device 106, and the cookie analysis application 108 by way of the communication links 110. Although not specifically shown in FIG. 1, the client device 104, the server device 106, and/or the cookie analysis application 108 may directly communicate by way of the communication links 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
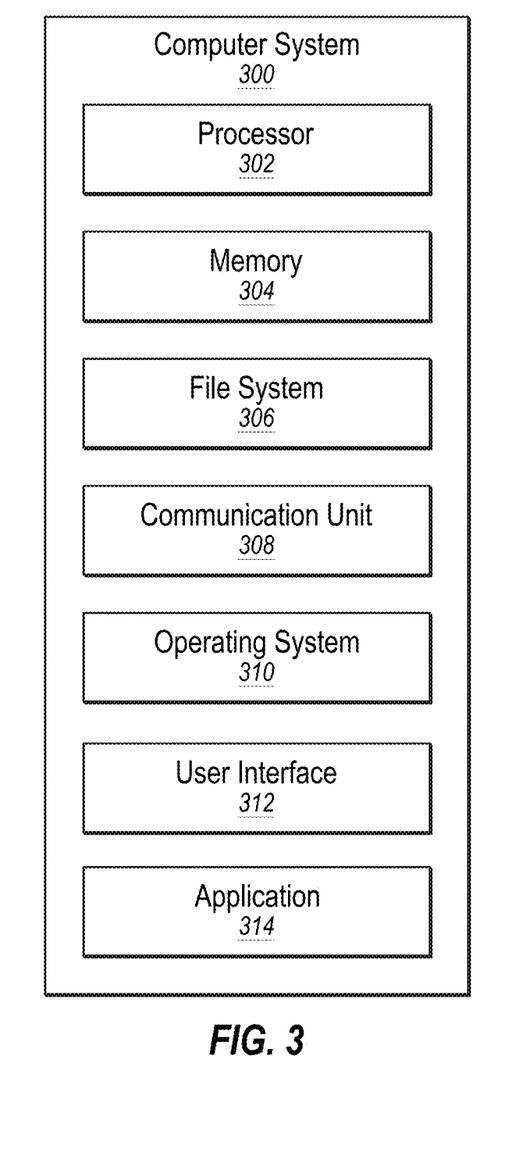
FIG. 3 illustrates an example computer system that may be employed in analyzing and mitigating website privacy issues by automatically classifying cookies.

In some embodiments, the client device 104 may be any computer system capable of communicating over the network 102 and executing a browser, examples of which are disclosed herein in connection with the computer system 300 of FIG. 3. Similarly, in some embodiments, the server device 106 may be any computer system capable of communicating over the network 102 and hosting a website, examples of which are disclosed herein in connection with the computer system 300 of FIG. 3.

In one embodiment, the cookie analysis application 108 may operate to initiate a headless web browser 114 running on the client device 104. The cookie analysis application 108 may further attach a debugger 116 to the headless web browser 114. Further, in one embodiment, the cookie analysis application 108 may monitor a request made of a web site 112 hosted on the server device 106 that is accessed by the headless web browser 114. The cookie analysis application 108 may further monitor requests 118 created on the website 112, monitor cookies 122 for the website 112 that are created in the headless web browser 114 while browsing the website 112 and that are then stored on the client device 104, and instrument a cookie creation function of cookies 122.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Also, the cookie analysis application 108 may execute on the client device 104, on the server device 106, or on another device not illustrated in FIG. 1.

Figure 2:
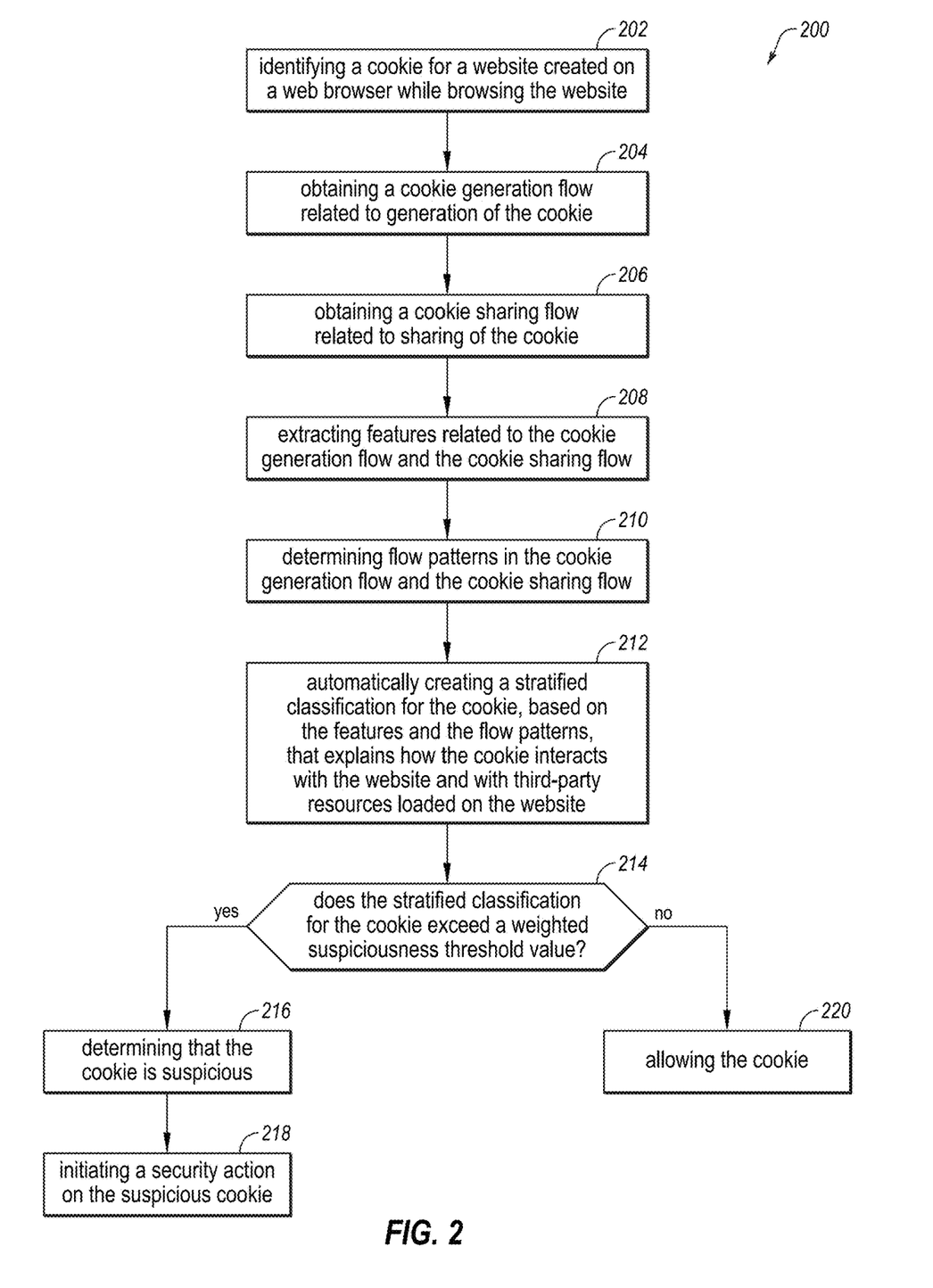
FIG. 2 illustrates a flowchart of an example method for analyzing and mitigating website privacy issues by automatically classifying cookies.

FIG. 2 is flowchart of an example method 200 for analyzing and mitigating website privacy issues by automatically classifying cookies. The method 200 may be performed, in some embodiments, by a device, application, and/or system, such as by the client device 104, the server device 106, and/or the cookie analysis application 108 executing on one of these devices or on another device. In these and other embodiments, the method 200 may be performed by one or more processors based on one or more computer-readable instructions stored on one or more non-transitory computer-readable media. The method 200 will now be described in connection with FIGS. 1 and 2.

Prior to the initiation of the method 200, the cookie analysis application 108 may initiate the headless web browser 114 in order to gain automated control of the website 112, monitor requests 118 that occur after the headless web browser 114 has navigated to the website 112, monitor scripts 120 created on the website 112, instrument functions determined to be used to create the cookies 122 by identified initiators, such as by using a protocol domain to instrument the functions, and trace the initial generation of cookie creation calls, including, for example, using a "StackTrace" analysis in the instrumentation of the function using the "Page" protocol domain. These actions are disclosed in greater detail in U.S. patent application Ser. No. 16/449,116, which is incorporated herein by reference in its entirety for all that it discloses.

The method 200 may include, at action 202, identifying a cookie for a website created on a web browser while browsing the website. For example, the cookie analysis application 108 may identify, at action 202, a cookie 122a (in the cookies 122 for the website 112) created on the headless web browser 114 while browsing the website 112.

The method 200 may include, at action 204, obtaining a cookie generation flow related to generation of the cookie. For example, the cookie analysis application 108 may obtain, at action 204, a cookie generation flow 124a related to generation of the cookie 122a. Obtaining a cookie generation flow is disclosed in greater detail in U.S. patent application Ser. No. 16/449,116.

The method 200 may include, at action 206, obtaining a cookie sharing flow related to sharing of the cookie. For example, the cookie analysis application 108 may obtain, at action 206, a cookie sharing flow 126a related to sharing of the cookie 122a, which may include tracking all the different requests 118 that shared the cookie 122a (e.g., included in a POST, in the cookie header, or embedded in the URL) and that create their own flows.

The method 200 may include, at action 208, extracting features related to the cookie generation flow and the cookie sharing flow. In some embodiments, the features related to the cookie generation flow may include creation information such as cookie parameter(s) (e.g., expiration date and "HttpOnly" flag), cookie name, cookie value, overwritten data, identifier detection (e.g., zxcvbn technique), or generation method (e.g., JavaScript or HTTP request), or some combination thereof. In some embodiments, the features related to the cookie generation flow may include creation trace such as historical server behavioral data, script data or metadata (e.g., inclusion context and method), request data or metadata (e.g., "cache control" or "content-disposition" headers), or execution context, or some combination thereof. In some embodiments, the features related to the cookie sharing flow may include sharing information such as cookie parameter(s), cookie name, cookie value, overwritten data, identifier detection, generation method, share type (e.g., included in URL or "postData" header), or share location, or some combination thereof. In some embodiments, the features related to the cookie sharing flow may include sharing trace such as historical server behavioral data, script data or metadata, request data or metadata, or execution context, or some combination thereof. For example, the cookie analysis application 108 may extract, at action 208, extracted features 128a related to the cookie generation flow 124a, such as cookie parameter(s), cookie name, cookie value, overwritten data, identifier detection, generation method, historical server behavioral data, script data or metadata, request data or metadata, or execution context, or some combination thereof. Further, in this example, the cookie analysis application 108 may extract, at action 208, extracted features 128a related to the cookie sharing flow 126a, such as cookie parameter(s), cookie name, cookie value, overwritten data, identifier detection, generation method, share type, share location, historical server behavioral data, script data or metadata, request data or metadata, or execution context, or some combination thereof.

The method 200 may include, at action 210, determining flow patterns in the cookie generation flow and the cookie sharing flow. In some embodiments, the determining of the flow patterns in the cookie generation flow and the cookie sharing flow may include determining relationships between the cookie generation flow and the cookie sharing flow. For example, the cookie analysis application 108 may determine, at action 210, flow patterns 130a in the cookie generation flow 124a and the cookie sharing flow 126a, which may include determining relationships between the cookie generation flow 124a and the cookie sharing flow 126a.

One example base flow pattern of behavior related to cookie generation flows may include, when overwriting situations happen, checking domains involved in each of the cookie writing processes, and detecting if there are flow similarities that indicate both situations are knowingly happening, and are not part of a possible malicious identification tampering attack. Also, another example base flow pattern of behavior related to cookie generation flows may include, when iframes are involved in the process, checking if the same domains that are creating cookies in the main websites, are also creating cookies in the iframes with similar names or values.

In addition, one example base flow pattern of behavior related to relationships between cookie generation flows and the cookie sharing flows may include, when an identifier cookie is shared, checking if all the domains involved in the creation of the cookie are the same as the domains involved in the sharing process, and if they are different, detecting when the divergence of the two paths occur, and finally separating according to, for example, a risk value associated with the domains, the number of steps from the first and last call, etc. Further, another example base flow pattern of behavior related to relationships between cookie generation flows and the cookie sharing flows may include, when a domain appears in multiple steps of the flows and different cookies, checking if the intermediate domains that were involved in the processes of creation are finally receiving the values of the identifier or if they are generating their independent identifier on the website's domains.

The method 200 may include, at action 212, automatically creating a stratified classification for the cookie, based on the features and the flow patterns, that explains how the cookie interacts with the website and with third-party resources loaded on the website. In some embodiments, the automatically creating of the stratified classification for the cookie may include independently calculating hierarchical groups for the cookie based on behaviors exhibited by the cookie. In some embodiments, the stratified classification for the cookie may further identify each party involved both in the generation of the cookie as well as in the sharing of the cookie. For example, the cookie analysis application 108 may automatically create, at action 212, a stratified classification 132a for the cookie 122a, based on the extracted features 128a and the flow patterns 130a, that explains how the cookie 122a interacts with the website 112 and with third-party resources loaded on the website 112, which may include independently calculating hierarchical groups for the cookie 122a based on behaviors exhibited by the cookie 122a. In this example, the stratified classification 132a for the cookie may further identify each party involved both in the generation of the cookie 122a as well as in the sharing of the cookie 122a. In this example, the stratified classification 132a may classify the cookie 122a as being in one of several different general categories of cookies without the need of any manually created blacklist. In some embodiments, taking into account results obtained in a large-scale scenario can enable specific weighted suspiciousness threshold values to be determined for each pattern, and can enable the creating of weighted suspiciousness threshold values for different stratified classification groups. In addition to the weighted suspiciousness threshold values, the normality of the flows and its relations per website and domain category can be defined, and anomalies as suspicious cases can be determined.

The method 200 may include, at action 214, determining whether the stratified classification for the cookie exceed a weighted suspiciousness threshold value. If so (yes at action 214), the method 200 may include the actions 216 and 218. If not (no at action 214), the method may include action 220. For example, the cookie analysis application 108 may determine, at action 214, whether the stratified classification 132a for the cookie 122a exceed a weighted suspiciousness threshold value 134a.

The method 200 may include, at action 216, determining that the cookie is suspicious. For example, the cookie analysis application 108 may determine, at action 216, that the cookie 122a is suspicious.

The method may include, at action 218, initiating a security action on the suspicious cookie. In some embodiments, the initiating of the security action on the suspicious cookie may include blocking the suspicious cookie, disabling the suspicious cookie, preventing creation of similar suspicious cookies, or alerting an administrator regarding the suspicious cookie, or a combination thereof. For example, the cookie analysis application 108 may initiate, at action 218 a security action on the suspicious cookie 122a, which may include blocking and/or disabling the suspicious cookie 122a, preventing creation of similar suspicious cookies, or alerting an administrator regarding the suspicious cookie 122a, or a combination thereof.

The method 200 may include, at action 220, allowing the cookie. For example, the cookie analysis application 108 may allow, at action 220, the cookie 122a, due to the cookie 122a not being determined to be a suspicious cookie.

The method 200 may further include analyzing the flow patterns in the cookie generation flow and the cookie sharing flow over time to identify differences in occurrences in existing domains or new domains, and in response to identifying differences in occurrences in the existing domains or in the new domains, creating a feedback cycle to update both the stratified classification for the cookie and the weighted suspiciousness threshold value. For example, the cookie analysis application 108 may (by potentially introducing a temporal axis) analyze the flow patterns 130a in the cookie generation flow 124a and the cookie sharing flow 126a over time to identify differences in occurrences in existing domains or new domains (e.g., the upturn or downturn of certain patterns), and in response to identifying differences in occurrences in the existing domains or in the new domains, create a feedback cycle to update both the stratified classification 132a for the cookie 122a and the weighted suspiciousness threshold value 134a, and/or to update the flow normality in website and domain categories.

Although the actions of the method 200 are illustrated in FIG. 2 as discrete actions, various actions may be divided into additional actions, combined into fewer actions, reordered, expanded, or eliminated, depending on the desired implementation. For example, in some embodiments, action 214 may be eliminated, or action 216 may be eliminated, or action 218 may be eliminated, or action 220 may be eliminated, or some combination thereof. In another example, action 218 may be performed by a user or system administrator or other person or entity different from the entity performing the other actions of the method 200.

The method 200 may thus be employed, in some embodiments, to better identify the different types of cookies that are being created on websites. In particular, the method 200 may be employed to precisely classify a cookie 122a by identifying the content of the cookie 122a as well as the parties that are involved both in the generation and the sharing of the cookie 122a. The method 200 may then employ this precise classification to control the cookie 122a in order to make the website 112 compliant with specific privacy regulations, such as the GDPR in the EU, and/or in order to protect users from being tracked without users' knowledge or permission.

The method 200 may provide a plurality of benefits and technological improvements, and may result in the practical application of analyzing cookies based on their content, generation flows, and sharing flows, as opposed to simply using blacklists or heuristics. Furthermore, the method 200 described herein may provide the technological improvement of determining all parties involved in the creation of, and sharing of, each cookie on a website and the techniques used to create and share each cookie. With this information, the cookies may be better controlled and any privacy issues caused by the cookies may be mitigated. Furthermore, controlling the cookies may result in the practical application of making websites compliant with regulations, such as the GDPR in the EU, and/or result in protecting users from being tracked without users' knowledge or permission.

Also, the method 200 may improve the technological field of personal and business privacy and security by targeting a specific type of attack, and stopping the attack before the attack occurs or preventing the attack from causing further damage. A security action may be implemented automatically, without input from a human administrator, to mitigate, eliminate, or otherwise stop a malicious attack. For example, a security action may include quarantining a machine, software, or a process; blacklisting a file or a function; blocking network connectivity, etc. Privacy may be an important aspect for both individuals and institutions, and the method 200 may provide an advanced and reliable method for analyzing web privacy and aiding websites in becoming compliant with regulations.

FIG. 3 illustrates an example computer system 300 that may be employed in analyzing and mitigating website privacy issues by automatically classifying cookies. In some embodiments, the computer system 300 may be part of any of the systems or devices described in this disclosure. For example, the computer system 300 may be part of any of the client device 104, the server device 106, and/or the cookie analysis application 108 of FIG. 1.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more of the actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more of the actions of the method 200 of FIG. 2. These computer-executable instructions may be included, for example, in the operating system 310, in one or more applications, such as the cookie analysis application 108 of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more of the actions of the method 200 of FIG. 2. In some embodiments, the application 314 may be part of the operating system 310 or may be part of an application of the computer system 300, or may be some combination thereof. In some embodiments, the application 314 may function as the cookie analysis application 108 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special-purpose or general-purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, is described with reference to specific embodiments; however, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed, and various embodiments with various modifications as may be suited to the particular use contemplated.

The invention claimed is:

1. A computer-implemented method for analyzing and mitigating website privacy issues by automatically classifying cookies, at least a portion of the method being performed by a computing device comprising one or more processors, the method comprising:
   identifying, by the computing device, a cookie for a website created on a web browser while browsing the website;
   obtaining, by the computing device, a cookie generation flow related to generation of the cookie;
   obtaining, by the computing device, a cookie sharing flow related to sharing of the cookie;
   extracting, by the computing device, features related to the cookie generation flow and the cookie sharing flow;
   determining, by the computing device, flow patterns in the cookie generation flow and the cookie sharing flow, including determining relationships between the cookie generation flow and the cookie sharing flow;
   automatically creating, by the computing device, a stratified classification for the cookie, based on the features and the flow patterns, that explains how the cookie interacts with the website and with third-party resources loaded on the website;
   determining, by the computing device, whether the stratified classification for the cookie exceeds a weighted suspiciousness threshold value; and
   in response to determining that the stratified classification for the cookie exceeds the weighted suspiciousness threshold value:
     determining, by the computing device, that the cookie is suspicious; and
     initiating a security action on the suspicious cookie.

2. The method of claim 1, wherein the initiating of the security action on the suspicious cookie comprises: blocking the suspicious cookie, disabling the suspicious cookie, preventing creation of similar suspicious cookies, or alerting an administrator regarding the suspicious cookie, or a combination thereof.

3. The method of claim 1, wherein the features related to the cookie generation flow comprise: cookie parameter(s), cookie name, cookie value, overwritten data, identifier detection, or generation method, or some combination thereof.

4. The method of claim 1, wherein the features related to the cookie generation flow comprise: historical server behavioral data, script data or metadata, request data or metadata, or execution context, or some combination thereof.

5. The method of claim 1, wherein the features related to the cookie sharing flow comprise: cookie parameter(s), cookie name, cookie value, overwritten data, identifier detection, generation method, share type, or share location, or some combination thereof.

6. The method of claim 1, wherein the features related to the cookie sharing flow comprise: historical server behavioral data, script data or metadata, request data or metadata, or execution context, or some combination thereof.

7. The method of claim 1, wherein the automatically creating of the stratified classification for the cookie comprises independently calculating hierarchical groups for the cookie based on behaviors exhibited by the cookie.

8. The method of claim 1, further comprising:
analyzing the flow patterns in the cookie generation flow and the cookie sharing flow over time to identify differences in occurrences in existing domains or new domains; and
in response to identifying differences in occurrences in the existing domains or in the new domains, creating a feedback cycle to update both the stratified classification for the cookie and the weighted suspiciousness threshold value.

9. The method of claim 1, wherein the stratified classification for the cookie further identifies each party involved both in the generation of the cookie as well as in the sharing of the cookie.

10. One or more non-transitory computer-readable media comprising one or more computer readable instructions that, when executed by one or more processors of a computing device, cause the computing device to perform a method for analyzing and mitigating website privacy issues by automatically classifying cookies, the method comprising:
identifying, by the computing device, a cookie for a website created on a web browser while browsing the website;
obtaining, by the computing device, a cookie generation flow related to generation of the cookie;
obtaining, by the computing device, a cookie sharing flow related to sharing of the cookie;
extracting, by the computing device, features related to the cookie generation flow and the cookie sharing flow;
determining, by the computing device, flow patterns in the cookie generation flow and the cookie sharing flow, including determining relationships between the cookie generation flow and the cookie sharing flow;
automatically creating, by the computing device, a stratified classification for the cookie, based on the features and the flow patterns, that explains how the cookie interacts with the website and with third-party resources loaded on the website;
determining, by the computing device, whether the stratified classification for the cookie exceeds a weighted suspiciousness threshold value; and
in response to determining that the stratified classification for the cookie exceeds the weighted suspiciousness threshold value:
determining, by the computing device, that the cookie is suspicious; and
initiating a security action on the suspicious cookie.

11. The one or more non-transitory computer-readable media of claim 10, wherein the initiating of the security action on the suspicious cookie comprises: blocking the suspicious cookie, disabling the suspicious cookie, preventing creation of similar suspicious cookies, or alerting an administrator regarding the suspicious cookie, or a combination thereof.

12. The one or more non-transitory computer-readable media of claim 10, wherein the features related to the cookie generation flow comprise: cookie parameter(s), cookie name, cookie value, overwritten data, identifier detection, or generation method, or some combination thereof.

13. The one or more non-transitory computer-readable media of claim 10, wherein the features related to the cookie generation flow comprise: historical server behavioral data, script data or metadata, request data or metadata, or execution context, or some combination thereof.

14. The one or more non-transitory computer-readable media of claim 10, wherein the features related to the cookie sharing flow comprise: cookie parameter(s), cookie name, cookie value, overwritten data, identifier detection, generation method, share type, or share location, or some combination thereof.

15. The one or more non-transitory computer-readable media of claim 10, wherein the features related to the cookie sharing flow comprise: historical server behavioral data, script data or metadata, request data or metadata, or execution context, or some combination thereof.

16. The one or more non-transitory computer-readable media of claim 10, wherein the automatically creating of the stratified classification for the cookie comprises independently calculating hierarchical groups for the cookie based on behaviors exhibited by the cookie.

17. The one or more non-transitory computer-readable media of claim 10, wherein the method further comprises:
analyzing the flow patterns in the cookie generation flow and the cookie sharing flow over time to identify differences in occurrences in existing domains or new domains; and
in response to identifying differences in occurrences in the existing domains or in the new domains, creating a feedback cycle to update both the stratified classification for the cookie and the weighted suspiciousness threshold value.

18. The one or more non-transitory computer-readable media of claim 10, wherein the stratified classification for the cookie further identifies each party involved both in the generation of the cookie as well as in the sharing of the cookie.

* * * * *